(12) United States Patent
Khojastepour et al.

(10) Patent No.: US 8,467,470 B2
(45) Date of Patent: *Jun. 18, 2013

(54) CODEBOOK METHOD FOR A MULTIPLE INPUT MULTIPLE OUTPUT WIRELESS SYSTEM

(75) Inventors: Mohammad A. Khojastepour, Lawrenceville, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,286

(22) Filed: Jun. 15, 2012

(65) Prior Publication Data

US 2012/0250791 A1 Oct. 4, 2012

Related U.S. Application Data

(62) Division of application No. 13/370,441, filed on Feb. 10, 2012, which is a division of application No. 12/112,110, filed on Apr. 30, 2008, now Pat. No. 8,135,083.

(60) Provisional application No. 60/915,239, filed on May 1, 2007.

(51) Int. Cl.
 *H04B 7/02* (2006.01)
(52) U.S. Cl.
 USPC ............................ 375/267; 375/347; 375/299

(58) Field of Classification Search
 USPC .................. 375/267, 299, 347; 455/101, 132
 See application file for complete search history.

(56) References Cited

U.S. PATENT DOCUMENTS

| | | | |
|---|---|---|---|
| 7,702,029 B2 * | 4/2010 | Kotecha et al. | 375/267 |
| 2005/0249306 A1 * | 11/2005 | Chae et al. | 375/267 |
| 2005/0281351 A1 * | 12/2005 | Jeong et al. | 375/267 |
| 2005/0286663 A1 * | 12/2005 | Poon | 375/347 |
| 2006/0034381 A1 * | 2/2006 | Ionescu et al. | 375/267 |
| 2006/0056531 A1 * | 3/2006 | Li et al. | 375/267 |
| 2006/0092054 A1 * | 5/2006 | Li et al. | 341/67 |
| 2006/0155533 A1 * | 7/2006 | Lin et al. | 704/223 |
| 2006/0155534 A1 * | 7/2006 | Lin et al. | 704/223 |
| 2006/0161432 A1 * | 7/2006 | Zhang et al. | 704/238 |
| 2007/0149181 A1 * | 6/2007 | Lin et al. | 455/415 |
| 2007/0226287 A1 * | 9/2007 | Lin et al. | 708/490 |
| 2007/0280373 A1 * | 12/2007 | Lee et al. | 375/267 |

(Continued)

*Primary Examiner* — Juan A Torres
(74) *Attorney, Agent, or Firm* — Akitaka Kimura; Joseph Kolodka

(57) ABSTRACT

A method for wireless encoding includes encoding wireless multiple input and multiple output signals in accordance with a codebook being one of a discrete codebook restricting elements of codebook entries to be within a predetermined finite set of complex numbers and a constant amplitude codebook including each entry in its codebook having equal column norm and equal row norm. In a preferred embodiment the digital codebook further includes restricting elements of a finite set in the discrete codebook to be in the form of $k^a + jk^b$ for a base-k computer and the constant amplitude codebook further includes being obtained through a series of successive householder transformations. In a preferred embodiment the codebook is configured as one of a constrained codebook in which the codebook is configured for multiple scenarios and a discrete codebook.

23 Claims, 2 Drawing Sheets

U.S. PATENT DOCUMENTS

| | | | |
|---|---|---|---|
| 2007/0280386 A1* | 12/2007 | Waes et al. | 375/347 |
| 2007/0286304 A1* | 12/2007 | Kim et al. | 375/267 |
| 2008/0037669 A1* | 2/2008 | Pan et al. | 375/260 |
| 2008/0080449 A1* | 4/2008 | Huang et al. | 370/342 |
| 2008/0108310 A1* | 5/2008 | Tong et al. | 455/69 |
| 2008/0219373 A1* | 9/2008 | Zhang et al. | 375/262 |
| 2008/0232501 A1* | 9/2008 | Khojastepour et al. | 375/267 |
| 2008/0247475 A1* | 10/2008 | Kim et al. | 375/260 |
| 2008/0272953 A1* | 11/2008 | Zheng et al. | 341/173 |
| 2009/0298424 A1* | 12/2009 | Liu et al. | 455/39 |
| 2010/0074309 A1* | 3/2010 | Lee et al. | 375/219 |
| 2010/0322349 A1* | 12/2010 | Lee et al. | 375/299 |

* cited by examiner

CODEBOOK METHOD FOR A MULTIPLE INPUT MULTIPLE OUTPUT WIRELESS SYSTEM

This application is a divisional of co-pending U.S. patent application No. 13/370,441, filed on Feb. 10, 2012, which in turn is a divisional of 12/112,110, filed on Apr. 30, 2008, which in turn claims the benefit of U.S. Provisional Application No. 60/915,239, entitled "Constrained and discrete precoding codebook design for MIMO systems", filed on May 1, 2007, the contents of which are incorporated by reference herein.

BACKGROUND OF THE INVENTION

The present invention relates generally to wireless communications and, more particularly, to a method for generating a codebook for multiple input multiple output MIMO wireless systems.

We consider a MIMO system with m transmit antennas at the base station and a user each with n receive antennas. The complex baseband signal model is given by $$y = Hx + w, \quad (1)$$

where x is the m×1 transmitted signal vector, H is the n×m channel matrix, $w \sim \mathcal{N}(0, I)$ is a circularly symmetric complex additive white Gaussian noise vector, and y is the n×1 received signal vector. We consider a block fading channel model in which the channel remains constant during the transmission of each packet (or codeword of length T) and it changes independently from one block to another, where the distribution of the channel state is known a priori. The average power constraint is given by $E[x^H x] \leq P$.

We consider maximizing the throughput in single user (SU-) MIMO systems (or sum-rate throughput for multiple user (MU-) MIMO systems) which is usually the primary goal in downlink transmissions. We make the following assumptions: (1) the user feeds back the quantized channel state via a limited feedback link; (2) based on the feedback information, the base station performs a linear precoding (and only linear precoding is allowed) of the transmitted streams.

Let UDV* be the singular value decomposition (SVD) of the channel matrix H. With B bits of feedback, the user quantizes the first k column of V (where k≤min(n, m) is a fixed number predetermined by the base station) using a quantization codebook $Q = \{Q_1, Q_2, \ldots, Q_{2^B}\}$, $Q_i \in \mathbb{C}^{m \times n}$, as follows $$\hat{V}(1:k) = \arg \arg_{Q \in Q} d(V(1:k), Q) \quad (2)$$

where d(.,.) is some distance metric. The codebook design problem and the appropriate choice of the distance metric have been considered in prior art. The columns of the quantized precoding matrix $\hat{V}(1:k)$ correspond to possible different streams for this user.

The transmitted signal x from the base station then consists of L data streams, $u_1, u_2, \ldots u_L$, sent through column vectors $g_1, g_2, \ldots g_L$ of a linear precoder G. We have $$x = Gu = \sum_{i=1}^{L} u_i g_i \quad (3)$$

In SU-MIMO systems, we have L=k while in MU-MIMO systems we have L≥k, where one or more than one stream may be intended for each user.

Conventionally, the quantized precoding codebook design for a m×n MIMO system deals with a packing of the n dimensional subspaces of an m dimensional vector space over the grassmanian manifold G(m, n). Different performance measures for such a design has been derived based on different distance metric over grassmanian manifolds. As a result, the element of each codebook entry is generally an arbitrary complex number.

Accordingly, there is a need for a method for codebook design that utilizes vector codebooks to generate the corresponding matrix codebooks for different transmission ranks, allow efficient precoder selection and the codebooks can be optimized for different scenarios (propagation environments/antenna configurations), In addition, the vector codebooks can also be designed to obtain a single codebook offering a robust performance across different scenarios.

SUMMARY OF THE INVENTION

In accordance with the invention, a method for wireless encoding includes encoding wireless multiple input and multiple output signals in accordance with a codebook being one of a discrete codebook restricting elements of codebook entries to be within a predetermined finite set of complex numbers and a constant amplitude codebook including each entry in its codebook having equal column norm and equal row norm.

In a preferred embodiment the digital codebook further includes restricting elements of a finite set in the discrete codebook to be in the form of $k^a + jk^b$ for a base-k computer and the constant amplitude codebook further includes being obtained through a series of successive householder transformations. In a preferred embodiment the codebook is configured as one of a constrained codebook in which the codebook is configured for multiple scenarios and a discrete codebook.

The constrained codebook includes a union set configuration wherein a union of the set of all channel realizations is taken for all scenarios and the codebook is configured for such union set and a successive approach wherein the codebook is configured of a smaller size for one scenario. With the successive approach the codebook is configured with fixing the designed entries and expanding the codebook by adding more entries to the codebook, then configuring new entries responsive to a new scenario and considering a constraint on fixed entries, then again fixing all configured entries and adding more entries and configuring the more entries responsive to a next scenario until all scenarios are accounted for.

The discrete codebook configuration includes finding a codebook with minimum distance of at least r which includes picking a random entry at the beginning and then trying to add other entries to the codebook, at each step finding the set of all possible entries of M such that their distances to all of the already picked entries of the codebook are greater than r, then picking the one entry which is closest to the current entries of the codebook, repeating this process until finding K elements which give a solution or to get to the point that the process cannot pick enough elements to form a codebook of size K.

BRIEF DESCRIPTION OF DRAWINGS

These and other advantages of the invention will be apparent to those of ordinary skill in the art by reference to the following detailed description and the accompanying drawings.

DETAILED DESCRIPTION

Multi-rank beamforming MRBF is an attractive low-complexity precoding scheme which adapts the transmission rank on a fast basis (i.e. once per coherent feedback) and employs a precoding codebook having a nested structure. The nested structure allows efficient SVD based selection to pick the best precoder codeword from the codebook for the given channel state. It also allows a low complexity channel quality information (CQI)-metric based precoder selection. Moreover, the nested codebook structure itself imposes no performance penalty when compared to the optimal unstructured codebook. The inventive codebook accommodates antenna selection and the rest of the codebook has its elements from a multiplicative group of size 16 GF(16).

Figure 1:
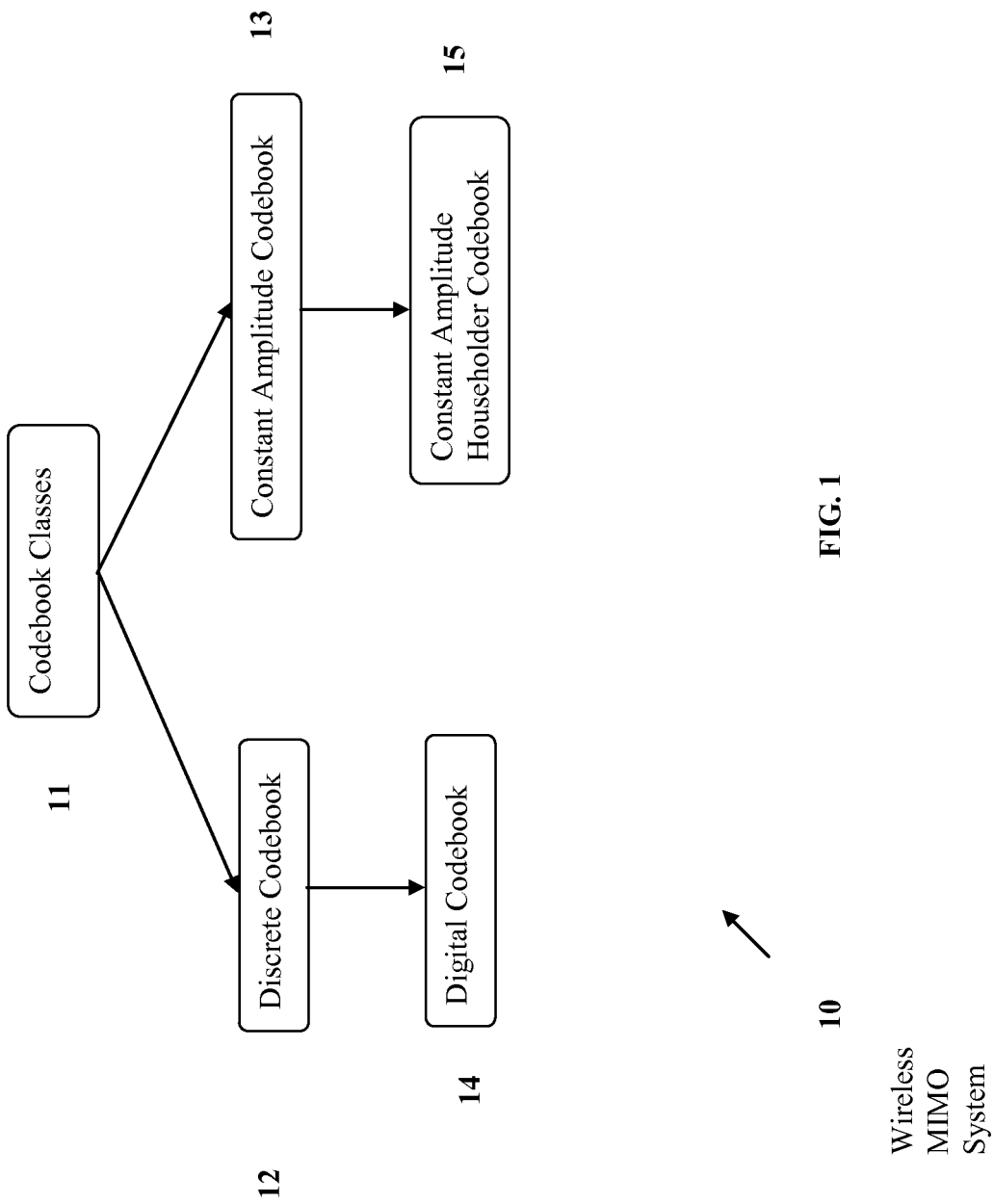
FIG. 1 is a block diagram of codebook classes in accordance with the invention.

Referring to the diagram 10 of FIG. 1, initially a codebook is partitioned into classes 11 as one of a discrete codebook 12 or a constant amplitude codebook 13. A discrete codebook includes a digital codebook 14 structure and a constant amplitude codebook includes a constant amplitude householder codebook 15 structure.

With a Discrete Codebook 12 we restrict the elements of the codebook entries to be within a predetermined finite set of complex numbers, for example: $\{1, -1, j, -j\}$, or $\{1, -1, j, -j, 1+j, 1-j, -1+j, -1-j\}$, or $\{\pm 1, \pm 2, \pm j, \pm 2j, \pm 1 \pm j, \pm 1 \pm 2j, \pm 2, \pm j, \pm 2 \pm 2j\}$, or $\{e^{2\pi j \alpha_1}, e^{2\pi j \alpha_2}, e^{2\pi j \alpha_3}, e^{2\pi j \alpha_4}\}$, or $\{1, -1, j, -j, a (1+j), a(1-j), a(-1+j), a(-1-j)\}$ where $$a = \frac{1}{\sqrt{2}}.$$

The advantage of a discrete codebook is a reduction in the complexity of the precoder selection algorithm.

With a Digital Codebook 14 we further restrict the elements of the finite set in the discrete codebook to be in the form of $2^a+j2^b$. For examples, any of the first three sets in the above example can be used to generate a digital codebook while the last two sets do not satisfy the condition. The advantage of the digital codebook is a reduction of the code complexity. Digital codebooks can practically avoid most of the multiplications by replacing the multiplication by doing a shift operation. It is well known that for the binary computers the multiplication in the form of $2^a$ x can be efficiently performed by using a shift operation. Today's computers are all binary based, thus we use the elements of the form $2^a+j2^b$, otherwise, we can use the general form $k^a+jk^b$ for the elements considering a possible base-k computer.

With a Constant Amplitude Codebook 13 each entry of the codebook has equal column norm and also equal row norm. The advantage of such a codebook is that the average transmit power across all antennas is equal. Therefore, for the system for which we use one power amplifier per each transmit antenna, the constant amplitude codebook structure is very essential and useful.

If the codebook has a constant amplitude property and is furthermore obtained through a series of successive householder transformation it is called a Constant Amplitude Householder Codebook 15. In particular for a system with 4 transmit antenna we use the following. Consider a set of 4 by 1 vectors where each elements of the vector is taken from a set of complex number in the form $\{1, e^{2\pi j \alpha_1}, e^{2\pi j \alpha_2}, \ldots, e^{2\pi j \alpha_g}\}$ which has g+1 elements, and the first element of each vector is 1. Then the householder transformation of any such 4 by 1 vector has the property that all elements of such matrix are also phase elements in the form $e^{2\pi j \alpha_k}$.

Figure 2:
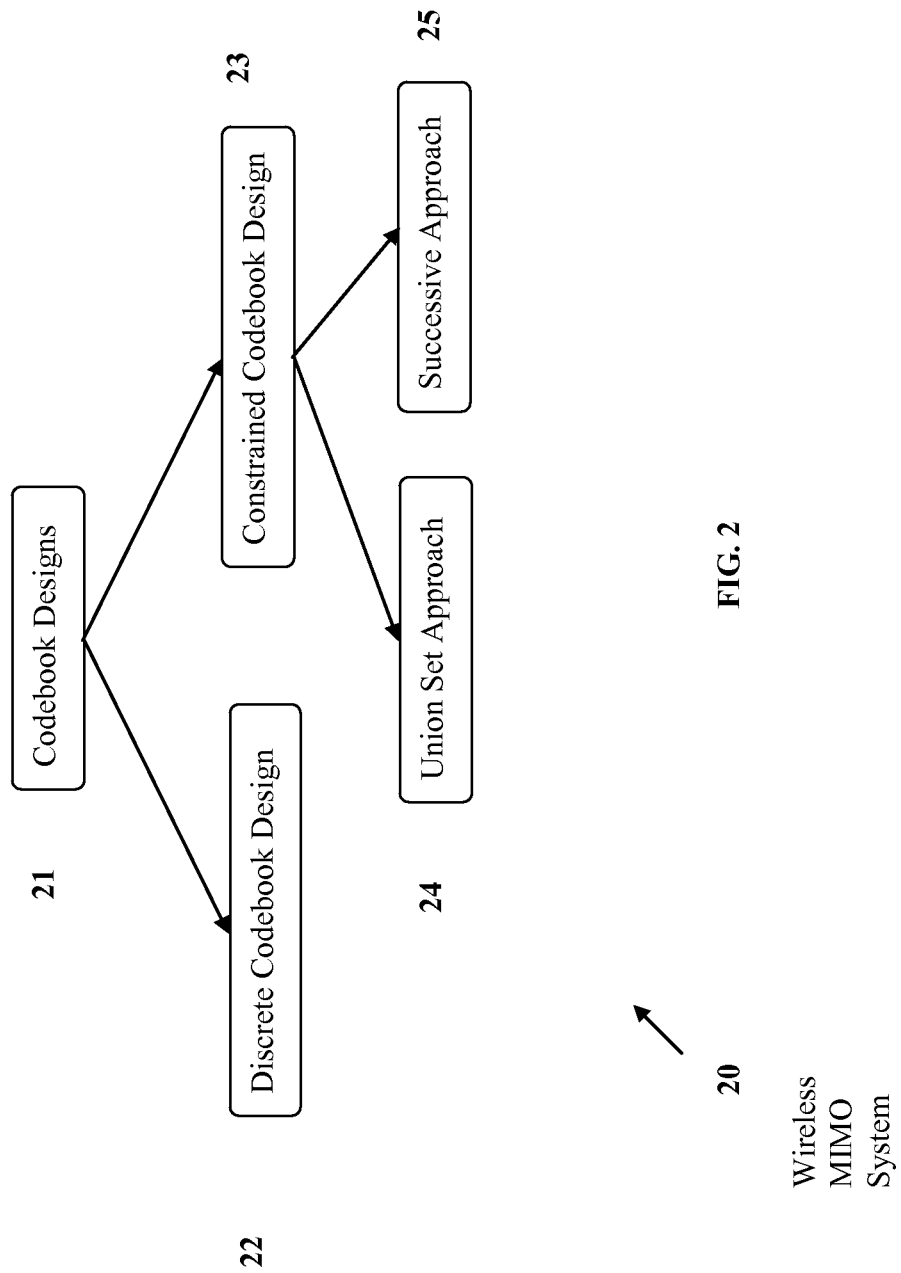
FIG. 2 Is a block diagram of codebook designs in accordance with the invention.

Referring now to the block diagram 20 of FIG. 2, codebook designs 21 in accordance with the invention include a discrete codebook design 22, and a constrained codebook design 23. The constrained codebook design 23 is further broken down into a union set approach 24 and a successive approach 25.

With respect to the Constrained Codebook Design 23, traditionally, the codebook is optimized for given channel statistics. If we design a codebook for multiple scenarios, i.e., different set of channel statistics the procedure is called constrained codebook design. Two approaches are considered, the union approach 24 and a successive approach 25.

In the Union Approach 24 we take the union of the set of all channel realizations for all scenarios and design a codebook for such union set.

In the Successive Approach 25 we design a codebook of smaller size for one scenario. We fixed the designed entries and expand the codebook by adding more entries to the codebook. We then design the new entries by considering the new scenario and considering the constraint on the fixed entries. Again, we fix all the designed entries and add more entry and design for the next scenario till all scenarios are treated. Note that this second approach requires the optimization of the number of codebook entries that are added in each step, also depends on the order in which the scenarios are treated. Intuitively, at each step we pick the scenario which requires smaller codebook for a given performance with respect to other remaining scenarios.

With respect to the Discrete Codebook Design 22, the approach to design a discrete codebook is to pick a set of entries that have maximum minimum distance. Different distance metric has been considered in the prior art. Since it is a discrete optimization problem, the solution is usually very hard to find. Let M denote all possible entry of a codebook where its elements are taken from the finite set G. Define a weighted graph where each node correspond to a possible entry of the codebook in the set M and each link between two node a and b is weighted by the distance between the two entry a and b, e.g., d(a,b). Finding the codebook of size K is equivalent to finding a clique of size K where the minimum of all the gains in this clique is maximized. Such problem is NP-hard, and thus hard to solve. In the following we propose an algorithm that can solve this problem within reasonable time for most practical cases.

Instead of trying to find a codebook with maximum minimum distance, we take the following approach to find a codebook with minimum distance of at least r. To do so, we pick a random entry at the beginning and then try to add other entries to the codebook. At each step, we find the set of all possible entries of M such that their distances to all of the already picked entries of the codebook are greater than r. Then, we pick the one which is closest to the current entries of the codebook. We repeat this process until we find K elements which gives a solution, or to get to the point that we cannot pick enough elements to form a codebook of size K. The detailed algorithm is given in Algorithm 1 in the IR form. By changing the value of r, we can optimize the designed codebook. Example of such optimized codebook is given as follows.

The following example gives a codebook which is a 'discrete codebook' and has 'householder structure' and 'constant amplitude property'. We consider the case when 16 possibilities are allowed per-rank and suggest the following constituent vector codebooks: $V^1=\{v_i^1 \in C^4\}_{i=1}^{16}$, $V^2=[1,0,0]^T \in C^3$, $V^3=[1,0]^T \in C^2$, where $C^N$ denotes the N-dimensional complex space and all the vectors have their first elements to be realvalued. Matrix code-words are formed using these vectors along with the unitary Householder matrices of the form, $$HH(w) = I - 2\frac{ww^*}{\|w\|^2}$$

(which is completely determined by the vector w).

Let $e_1^N=[1,0,\ldots,0]^T \in C^N$. Since householder formula is not defined for $e_1^N=[1,0,\ldots,0]^T \in C^N$, we define $HH(e_1^N)=I_{N \times N}$.

The matrix codebook for 4×4 cases is obtained using the householder formula defined as $$A(v_i^1, v_j^2, v_j^2, \ldots) = \left[v_i^1, HH(v_i^1 - e_1^4)\begin{bmatrix}0\\v_j^2\end{bmatrix}\right.$$

$$\left.HH(v_i^1 - e_1^4)\begin{bmatrix}0\\HH(v_j^2 - e_1^4)\begin{bmatrix}0\\v_k^3\end{bmatrix}\end{bmatrix}, \ldots\right], 1 \leq i \leq 16, 1 \leq j, k \leq 1.$$

In the special case of the vector codebook defined in Appendix 1 below, we can simplify the above matrix codebook as a formula as $A(v_i^1, v_j^2, v_j^2, \ldots) = HH(v_i^1 - e_1^4)$, $1 \leq i \leq 16$, which is the codebook of size 16 for rank 4 transmission. The codebook for rank one is obtained by collecting the first columns of these 16 matrices. The codebook of rank 3 is the collection of matrices obtained by choosing the last 3 columns of each matrix, and the codebook of rank 2 is optimized by selecting 4×2 matrices by choosing the columns as defined in appendix 1 below. For the CQI-metric based precoder selection with linear minimum mean square error (LMMSE) receiver it has been shown that due to the nested structure of the codebook, significant complexity savings can be accrued by avoiding the redundant computations.

Moreover, the elements of the codeword matrices also belong to a multiplicative group of complex numbers, defined as GF(16) where the 16 elements of the group are defined as $\exp(j2\pi k/16)$, $1 \leq k \leq 16$. It can be shown that for a 4TX antenna system, if all elements of the vector codebook belong to a multiplicative group of GF(N) then all the elements of the matrix codebook belong to the same group. Considering the above property, the number of multiplications is much less than the case where the codebook elements are arbitrary complex numbers.

Appendix 1: MRBF Vector Codebooks
MRBF-Vector Codebook in C with Elements from GF(16)

| Vector index | First element | Second element | Third element | Fourth element |
|---|---|---|---|---|
| 1 | 1 | 1 | 1 | 1 |
| 2 | 1 | −i | −i | −1 |
| 3 | 1 | i | I | −1 |
| 4 | 1 | −0.3826 + 0.9239i | −0.7070 − 0.7071i | 0.9239 − 0.3826i |
| 5 | 1 | 0.3826 − 0.9239i | −0.7070 − 0.7071i | −0.9239 + 0.3826i |
| 6 | 1 | −0.7071 + 0.7071i | −i | 0.7071 + 0.7071i |
| 7 | 1 | −0.7071 + 0.7071i | I | −0.7071 + 0.7071i |
| 8 | 1 | −0.9239 − 0.3826i | 0.7071 + 0.7071i | −0.3826 − 0.9239i |
| 9 | 1 | 0.7071 − 0.7071i | −i | −0.7071 − 0.7071i |
| 10 | 1 | 0 | 0 | 0 |
| 11 | 0 | 1 | 0 | 0 |
| 12 | 0 | 0 | 1 | 0 |
| 13 | 0 | 0 | 0 | 1 |
| 14 | 1 | i | −i | −0.7071 − 0.7071i |
| 15 | 1 | −i | −i | 0.7071 + 0.7071i |
| 16 | 1 | 1 | −0.7071 + 0.7071i | 1 |

MRBF-Vector Codebook in C

| Vector index | First element | Second element | Third element |
|---|---|---|---|
| 1 | 1 | 0 | 0 |

MRBF-Vector Codebook in $C^2$

| Vector index | First element | Second element |
|---|---|---|
| 1 | 1 | 0 |

MRBF-Rank 2 Codebook Index

| Codebook index | 4 × 4 matrix index | First column | Second column |
|---|---|---|---|
| 1 | 1 | 1 | 2 |
| 2 | 2 | 1 | 2 |
| 3 | 3 | 1 | 2 |
| 4 | 7 | 1 | 3 |
| 5 | 8 | 1 | 3 |
| 6 | 10 | 2 | 3 |
| 7 | 13 | 1 | 3 |
| 8 | 10 | 3 | 4 |
| 9 | 10 | 1 | 4 |
| 10 | 10 | 2 | 4 |
| 11 | 9 | 1 | 3 |
| 12 | 14 | 3 | 4 |
| 13 | 10 | 1 | 2 |
| 14 | 10 | 1 | 3 |
| 15 | 11 | 3 | 4 |
| 16 | 12 | 1 | 2 |

Simulation results for the inventive codebook technique show that for both link level and the improved link level that the MRBF scheme employing the inventive codebook design provides gains over the discrete fourier transform DFT-codebook based schemes at low geometries, hence benefiting cell-edge users. Moreover, the MRBF scheme with the inventive codebook design also results in lower complexity than the DFT-codebook due to its codebook structure as well as its simple vector codebooks.

The proposed MRBF codebook structure in accordance with the invention utilizes vector codebooks to generate the corresponding matrix codebooks for different transmission rank and allows efficient precoder selection via either the singular value decomposition SVD or continuous quality improvement CQI metric. The constituent vector codebooks can be optimized for different scenarios (propagation environments/antenna configurations), which allows us to leverage the flexibility offered by multiple codebooks. In addition the vector codebooks can also be designed to obtain a single codebook offering a robust performance across different scenarios. Simulation results demonstrate that the MRBF scheme outperforms the DFT codebook based scheme as well as the conventional Householder codebook based scheme.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, not explicitly shown or described herein, embody the principles of the invention and are within their spirit and scope.

What is claimed is:

1. A method implemented in a multi-rank beamforming wireless communications system, comprising:
   precoding a signal in accordance with a codebook comprising a plurality of codebook entries per rank; and
   transmitting the precoded signal,
   wherein the codebook restricts elements of codebook entries to be within a predetermined finite set of complex numbers, and each entry in the codebook has both equal column norm and equal row norm,
   wherein the wireless communications system has at least 4 transmission antennas, and
   wherein the codebook entries are matrices A that satisfy the following expression:

$$A = \left[ v_{i_1}^1, HH(v_{i_1}^1 - e_1^M) \begin{bmatrix} 0 \\ v_{i_2}^2 \end{bmatrix} \right],$$

$$HH(v_{i_1}^1 - e_1^M) \begin{bmatrix} 0 \\ HH(v_{i_2}^2 - e_1^{M-1}) \begin{bmatrix} 0 \\ v_{i_3}^3 \end{bmatrix} \end{bmatrix}, \ldots \right],$$

where M is the number of transmit antennas, $e_1^N = [1, 0, \ldots, 0]^T \in C^N$, $C^N$ is an N-dimensional complex space, $$HH(w) = \begin{cases} I - 2\frac{ww^H}{\|w\|^2} & \text{if } w \neq 0 \\ I & \text{if } w = 0 \end{cases}, v_{i_l}^j \in C^{M-j+1} \ (l = 1, 2, 3, \ldots)$$

denotes a column vector, and $i_l$ denotes an index of the column vector.

2. The method as in claim 1, wherein the multi-rank beamforming wireless communications system comprises a base station.

3. The method as in claim 1, wherein the predetermined finite set consists of numbers in a form of $2^a + j2^b$, where a and b are positive integers.

4. The method as in claim 1, wherein the predetermined finite set consists of numbers in a form of $k^a + jk^b$, where a and b are positive integers.

5. The method as in claim 1, wherein the codebook is obtained through a series of successive householder transformations.

6. The method as in claim 1, wherein the codebook is configured for multiple scenarios.

7. The method as in claim 1, wherein the predetermined finite set of complex numbers consists of $\{1, -1, j, -j\}$.

8. The method as in claim 1, wherein the predetermined finite set of complex numbers consists of $\{1, -1, j, -j, 1+j, 1-j, -1+j, -1-j\}$.

9. The method as in claim 1, wherein the predetermined finite set of complex numbers consists of $\{\pm 1, \pm 2, \pm j, \pm 2j, \pm 1 \pm j, \pm 1 \pm 2j, \pm 2, \pm j, \pm 2 \pm 2j\}$.

10. The method as in claim 1, wherein the predetermined finite set of complex numbers consists of $\{e^{2\pi j\alpha_1}, e^{2\pi j\alpha_2}, e^{2\pi j\alpha_3}, e^{2\pi j\alpha_4}\}$, where $\alpha_1, \alpha_2, \alpha_3,$ and $\alpha_4$ are complex numbers.

11. The method as in claim 1, wherein the predetermined finite set of complex numbers consists of $\{1, -1, j, -j, a(1+j), a(1-j), a(-1+j), a(-1-j)\}$, where $$a = \frac{1}{\sqrt{2}}.$$

12. The method as in claim 5, wherein, for 4 transmit antenna communications, the codebook comprises a set of 4 by 1 vectors where elements of each vector are taken from a set of complex numbers in a form of $\{1, e^{2\pi j\alpha_1}, e^{2\pi j\alpha_2}, \ldots, e^{2\pi j\alpha_g}\}$, and the first element of each vector is 1, where $\alpha_1, \ldots,$ and $\alpha_g$ are complex numbers.

13. The method as in claim 7, wherein the multiple scenarios comprise a different set of channel statistics.

14. The method as in claim 7, wherein the codebook comprises a union set configuration wherein a union of the set of all channel realizations is taken for all scenarios and the codebook is configured for such union set.

15. The method as in claim 7, wherein the codebook is obtained through a successive approach wherein the codebook is configured of a smaller size for one scenario.

16. The method as in claim 7, wherein the codebook is obtained through a successive approach wherein the codebook is configured with fixing designed entries and expanding the codebook by:
adding more entries to the codebook;
configuring new entries responsive to a new scenario and considering a constraint on fixed entries;
fixing all configured entries;
adding more entries; and
configuring the more entries responsive to a next scenario until all scenarios are accounted for.

17. The method as in claim 16, wherein the codebook is obtained through optimization of the number of codebook entries that are added in each step, and depends on the order in which the scenarios are treated, picking at each step the scenario which requires a smaller codebook for a given performance with respect to other remaining scenarios.

18. A method implemented in a multi-rank beamforming wireless communications system, comprising:
  receiving a signal precoded in accordance with a codebook comprising a plurality of codebook entries per rank,
  wherein the codebook restricts elements of codebook entries to be within a predetermined finite set of complex numbers and each entry in the codebook has both equal column norm and equal row norm,
  wherein the wireless communications system has at least 4 transmission antennas, and
  wherein the codebook entries are matrices that satisfy the following expression:

$$A = \left[ v_{i_1}^1, HH(v_{i_1}^1 - e_1^M) \begin{bmatrix} 0 \\ v_{i_2}^2 \end{bmatrix} \right],$$

$$\left[ HH(v_{i_1}^1 - e_1^M) \begin{bmatrix} 0 \\ HH(v_{i_2}^2 - e_1^{M-1}) \begin{bmatrix} 0 \\ v_{i_3}^3 \end{bmatrix} \end{bmatrix}, \ldots \right],$$

where M is the number of transmit antennas, $e_1^N = [1, 0, \ldots, 0]^T \in C^N$, $C^N$ is an N-dimensional complex space, $$HH(w) = \begin{cases} I - 2\frac{ww^H}{\|w\|^2} & \text{if } w \neq 0 \\ I & \text{if } w = 0 \end{cases}, v_{i_l}^j \in C^{M-j+1} \ (l = 1, 2, 3, \ldots)$$

denotes a column vector, and $i_l$ denotes an index of the column vector.

19. The method as in claim 18, wherein the multi-rank beamforming wireless communications system comprises a user equipment.

20. A multi-rank beamforming wireless communications system, comprising:
  a precoding unit to precode a signal in accordance with a codebook comprising a plurality of codebook entries per rank; and
  a transmission unit to transmit the precoded signal,
  wherein the codebook restricts elements of codebook entries to be within a predetermined finite set of complex numbers, and each entry in the codebook has both equal column norm and equal row norm,
  wherein the wireless communications system has at least 4 transmission antennas, and
  wherein the codebook entries are matrices that satisfy the following expression:

$$A = \left[ v_{i_1}^1, HH(v_{i_1}^1 - e_1^M) \begin{bmatrix} 0 \\ v_{i_2}^2 \end{bmatrix} \right],$$

$$\left[ HH(v_{i_1}^1 - e_1^M) \begin{bmatrix} 0 \\ HH(v_{i_2}^2 - e_1^{M-1}) \begin{bmatrix} 0 \\ v_{i_3}^3 \end{bmatrix} \end{bmatrix}, \ldots \right],$$

where M is the number of transmit antennas, $e_1^N = [1, 0, \ldots, 0]^T \in C^N$, $C^N$ is an N-dimensional complex space, $$HH(w) = \begin{cases} I - 2\frac{ww^H}{\|w\|^2} & \text{if } w \neq 0 \\ I & \text{if } w = 0 \end{cases}, v_{i_l}^j \in C^{M-j+1} \ (l = 1, 2, 3, \ldots)$$

denotes a column vector, and $i_l$ denotes an index of the column vector.

21. The multi-rank beamforming wireless communications system as in claim 20, wherein the multi-rank beamforming wireless communications system comprises a base station.

22. A multi-rank beamforming wireless communications system, comprising:
  a receiving unit to receive a signal precoded in accordance with a codebook comprising a plurality of codebook entries per rank,
  wherein the codebook restricts elements of codebook entries to be within a predetermined finite set of complex numbers and each entry in the codebook has both equal column norm and equal row norm,
  wherein the wireless communications system has at least 4 transmission antennas, and
  wherein the codebook entries are matrices that satisfy the following expression:

$$A = \left[ v_{i_1}^1, HH(v_{i_1}^1 - e_1^M) \begin{bmatrix} 0 \\ v_{i_2}^2 \end{bmatrix} \right],$$

$$\left[ HH(v_{i_1}^1 - e_1^M) \begin{bmatrix} 0 \\ HH(v_{i_2}^2 - e_1^{M-1}) \begin{bmatrix} 0 \\ v_{i_3}^3 \end{bmatrix} \end{bmatrix}, \ldots \right],$$

where M is the number of transmit antennas, $e_1^N = [1, 0, \ldots, 0]^T \in C^N$, $C^N$ is an N-dimensional complex space, $$HH(w) = \begin{cases} I - 2\frac{ww^H}{\|w\|^2} & \text{if } w \neq 0 \\ I & \text{if } w = 0 \end{cases}, v_{i_l}^j \in C^{M-j+1} \ (l = 1, 2, 3, \ldots)$$

denotes a column vector, and $i_l$ denotes an index of the column vector.

23. The multi-rank beamforming wireless communications system as in claim 22, wherein the multi-rank beamforming wireless communications system comprises a user equipment.

* * * * *